(12) United States Patent
Cheng et al.

(10) Patent No.: US 10,999,840 B2
(45) Date of Patent: May 4, 2021

(54) METHOD AND DEVICE FOR DATA TRANSMISSION OF FRONT-HAUL TRANSPORT NETWORK, AND COMPUTER STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Weiqiang Cheng, Beijing (CN); Han Li, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 57 days.

(21) Appl. No.: 16/474,038

(22) PCT Filed: Dec. 25, 2017

(86) PCT No.: PCT/CN2017/118411
§ 371 (c)(1),
(2) Date: Jun. 26, 2019

(87) PCT Pub. No.: WO2018/121489
PCT Pub. Date: Jul. 5, 2018

(65) Prior Publication Data
US 2019/0342889 A1 Nov. 7, 2019

(30) Foreign Application Priority Data
Dec. 26, 2016 (CN) .......................... 201611220213.0

(51) Int. Cl.
*H04W 72/04* (2009.01)
*H04L 5/00* (2006.01)
(Continued)

(52) U.S. Cl.
CPC ....... *H04W 72/0446* (2013.01); *H04L 5/0048* (2013.01); *H04L 5/0064* (2013.01); *H04L 45/745* (2013.01); *H04W 28/22* (2013.01)

(58) Field of Classification Search
None
See application file for complete search history.

(56) References Cited

U.S. PATENT DOCUMENTS

2010/0046456 A1* 2/2010 Yi .......................... H04W 72/10
370/329
2012/0106338 A1* 5/2012 Pongracz .......... H04W 28/0268
370/235
(Continued)

FOREIGN PATENT DOCUMENTS

CN      1866967 A      11/2006
CN      1960484 A       5/2007
(Continued)

OTHER PUBLICATIONS

Intel Corporation. "RPa160033, Requirements Related to RAN Architecture for the Next Generation Access". 3GPP TSG RAN ad hoc. Jan. 29, 2016 (Jan. 29, 2016). pp. 1-4.
(Continued)

*Primary Examiner* — Chi H Pham
*Assistant Examiner* — Vladislav Y Agureyev
(74) *Attorney, Agent, or Firm* — Syncoda LLC; Feng Ma

(57) ABSTRACT

A data transmission method and device for a front-haul transport network include: determining a configuration parameter of a logical channel for transmitting data, the configuration parameter including: the type of the logical
(Continued)

channel; different logical channels have different transmission latency and/or different physical transmission resource utilization rates; according to the configuration parameter, mapping the logical channel onto one or more unit frames of a superframe, each unit frame having a preset corresponding relationship with a physical transmission resource; and according to the type of the logical channel mapped by the unit frame, transmitting data carried by the unit frame.

19 Claims, 7 Drawing Sheets

(51) Int. Cl.
*H04L 12/741* (2013.01)
*H04W 28/22* (2009.01)

(56) References Cited

U.S. PATENT DOCUMENTS

| | | | |
|---|---|---|---|
| 2013/0077603 A1* | 3/2013 | Lin | H04W 72/0446 370/336 |
| 2015/0117287 A1* | 4/2015 | Kim | H04W 48/16 370/311 |
| 2015/0230234 A1* | 8/2015 | Choi | H04W 52/0216 370/329 |
| 2015/0350928 A1* | 12/2015 | Zhang | H04W 52/40 370/252 |
| 2016/0128085 A1 | 5/2016 | Liu et al. | |
| 2016/0142934 A1* | 5/2016 | Ahmadzadeh | H04W 72/04 370/328 |
| 2016/0234819 A1* | 8/2016 | da Silva | H04L 41/5054 |
| 2016/0316463 A1* | 10/2016 | Liu | H04W 72/1263 |
| 2017/0257876 A1* | 9/2017 | Loehr | H04W 72/10 |
| 2017/0310433 A1* | 10/2017 | Dinan | H04L 5/0098 |
| 2017/0310531 A1* | 10/2017 | Dinan | H04L 27/32 |
| 2018/0049079 A1* | 2/2018 | Ozturk | H04W 28/16 |
| 2018/0131484 A1* | 5/2018 | Andreoli-Fang | H04W 24/10 |
| 2018/0132294 A1* | 5/2018 | Xing | H04W 72/04 |
| 2018/0176910 A1* | 6/2018 | Yang | H04W 72/0446 |
| 2018/0191551 A1* | 7/2018 | Chun | H04L 67/12 |
| 2018/0324872 A1* | 11/2018 | Babaei | H04L 5/0053 |
| 2019/0075586 A1* | 3/2019 | Xu | H04W 72/1284 |
| 2019/0089498 A1* | 3/2019 | Pelletier | H04W 72/005 |
| 2019/0124674 A1* | 4/2019 | Lee | H04W 76/27 |
| 2019/0223049 A1* | 7/2019 | Zhang | H04W 24/10 |
| 2019/0313288 A1 | 10/2019 | Li et al. | |
| 2019/0350005 A1* | 11/2019 | Liu | H04W 68/005 |
| 2020/0015312 A1* | 1/2020 | He | H04W 4/70 |
| 2020/0186391 A1* | 6/2020 | Su | H04L 12/66 |
| 2020/0296749 A1* | 9/2020 | Freda | H04W 28/0268 |

FOREIGN PATENT DOCUMENTS

| | | |
|---|---|---|
| CN | 102217246 A | 10/2011 |
| CN | 102307230 A | 1/2012 |
| CN | 104883701 A | 9/2015 |
| CN | 105517028 A | 4/2016 |
| CN | 105703811 A | 6/2016 |
| CN | 106028370 A | 10/2016 |
| CN | 106888078 A | 6/2017 |
| EP | 2131602 A1 | 12/2009 |
| EP | 2434661 A1 | 3/2012 |
| EP | 3554181 A1 | 10/2019 |
| JP | 2012209859 A | 10/2012 |
| WO | 2008120297 A1 | 10/2008 |

OTHER PUBLICATIONS

"Discussion on Optical Transport Solution and Application in Mobile Fronthaul Network;" Shen Shikui, Wang Guangquan, mailed on Nov. 20, 2015.
International Search Report in the international application No. PCT/CN2017/118411, dated Mar. 2, 2018.
English translation of the Written Opinion of the International Search Authority in the international application No. PCT/CN2017/118411, dated Mar. 2, 2018.
Supplementary European Search Report in the European application No. 17887323.8, dated Nov. 26, 2019.
David Chen et a l : "Qbv Optional for Fronthaul over Ethernet; cm-chen-Qbv-Optional-for-Fronthault-over-Ethernet-0316-v00", IEEE Draft; CM-CHEN-QBV-Optiona l-For-Fronthau lt-Over-Ethernet-0316-V00 , IEEE-SA , Piscatawa y , NJ USA , vol. 802 , No. v00, Mar. 15, 2016 (Mar. 15, 2016) , pp. 1-7 , XP068109703 , [retrieved on Mar. 15, 2016] the whole document.

* cited by examiner

METHOD AND DEVICE FOR DATA TRANSMISSION OF FRONT-HAUL TRANSPORT NETWORK, AND COMPUTER STORAGE MEDIUM

CROSS-REFERENCE TO RELATED APPLICATION

The present application claims priority to Chinese Patent Application No. 201611220213.0, filed on Dec. 26, 2016, the disclosure of which is hereby incorporated by reference in its entirety.

TECHNICAL FIELD

The disclosure relates to the technical field of networks, and in particular to a data transmission method and device for a front-haul transport network and a computer storage medium.

BACKGROUND

Front-haul transport network (FTN) is a transport network between a remote radio unit (RRU) and a base band unit (BBU). A front end of the FTN is connected to the RRU, and a back end of the FTN is connected to a BBU pool consisted of multiple BBUs.

Currently, in the FTN, a common public radio interface (CPRI) is used for time division multiplex (TMD) transmission. A basic unit of data transmission is a frame. Some bytes of the frame are used to carry data of a control plane, and some bytes of the frame are used to carry data of a user plane. When data is transported in the FTN, each transmission node selects a transmission slot for transmission according to the data of the control plane after receiving the frame.

With the increasing of the business, such transmission mode of the FTN has been difficult to adapt to requirements of a bandwidth and a transmission delay required for data transmission.

Therefore, how to propose a new data transmission method for FTN capable of solving the problem of a large transmission delay, a slow transmission rate, or a low effective utilization rate of physical transmission resources is an urgent problem to be solved in the related art.

SUMMARY

In view of this, embodiments of the present disclosure are directed to providing a data transmission method and device for an FTN and a computer storage medium to at least partially solve the above problems.

The technical solution of the present disclosure is implemented as follows.

In a first aspect of the embodiments of the present disclosure, it is provided a data transmission method for an FTN, which includes the following operations.

A configuration parameter of a logical channel for data transmission is determined, where the configuration parameter includes a type of the logical channel, different logical channels have different transmission delays and/or different utilization rates of physical transmission resources;

the logical channel is mapped to at least one block frame of a frame based on the configuration parameter, where each block frame has a preset correspondence with a physical transmission resource; and data carried in the at least one block frame is transported according to a type of the logical channel mapped to the at least one frame.

In a second aspect of the embodiments of the present disclosure, it is provided a data transmission device for an FTN, which includes a determining unit, a mapping unit and a transporting unit.

The determining unit is configured to determine a configuration parameter of a logical channel for data transmission, where the configuration parameter includes a type of the logical channel, different logical channels have different transmission delays and/or different utilization rates of physical transmission resources.

The mapping unit is configured to map the logical channel to at least one block frame of a frame according to the configuration parameter, where each block frame has a preset correspondence with a physical transmission resource.

The transporting unit is configured to transport, according to the type of the logical channel mapped to the at least one block frame, data carried in the at least one block frame.

The embodiments of the disclosure further provide a computer storage medium, where the computer storage medium stores computer executable instructions. When the computer executable instructions are executed, the foregoing data transmission method for the FTN can be implemented.

In the data transmission method and device for the FTN in the embodiments of the present disclosure, before performing data transmission, a logical channel for transporting data is determined, and the logical channel is mapped to a block frame of a frame corresponding to the physical transmission resources in advance. Therefore, mapping between the logical channel and the physical transmission resources is realized. And then according to the type of the logical channel, data transmission is performed using the physical transmission resource corresponding to the block frame. In this way, different mappings between different logical channels and physical transmission resources are realized, and transmissions of different data having different requirements such as transmission delays can be distinguished. Various logical channels are set so as to satisfy transmissions of the data having different transmission requirements. A logical channel with a small transmission delay may be selected to transport data with a high transmission delay requirement, thereby ensuring that the transmission delay of the data is satisfied. A logical channel with a high resource utilization rate may be selected to transport data with a low transmission delay requirement, thereby improving the effective utilization rate of physical transmission resources in the physical layer, and a good balance can be realized between the transmission delay and the efficient utilization of the transmission resources.

DETAILED DESCRIPTION

Figure 1:
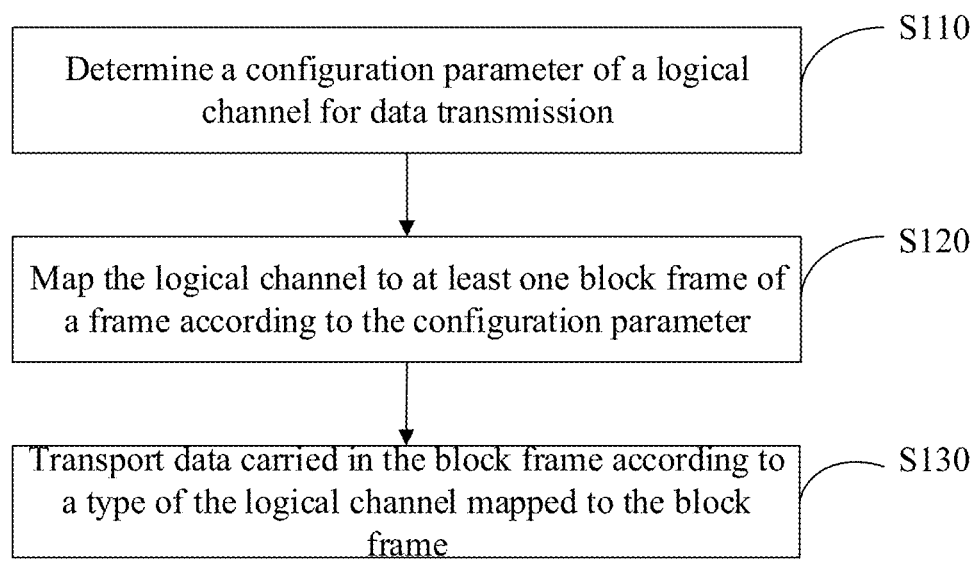
FIG. 1 is a flowchart of a data transmission method for an FTN according to an embodiment of the present disclosure.

The technical solutions of the present disclosure are further elaborated below in conjunction with the drawings and specific embodiments of the specification. As illustrated in FIG. 1, a data transmission method for an FTN is provided in this embodiment, which includes the following operations.

At block S110, a configuration parameter of a logical channel for data transmission is determined, where the configuration parameter includes a type of the logical channel. Different logical channels have different transmission delays and/or different utilization rates of physical transmission resources.

At block S120, the logical channel is mapped to at least one block frame of the frame based on the configuration parameter, where each block frame has a preset correspondence with a physical transmission resource.

At block S130, data carried in the at least one block frame is transported according to the type of the logical channel mapped to the at least one block frame.

The method in this embodiment may be a method applicable to any one of the transmission nodes of the FTN.

One frame may include multiple block frames. Each of the multiple block frames corresponds to a respective one of time-frequency resources, and the time-frequency resource corresponding to one block frame is different from that for another block frame. But the number of the time-frequency resources corresponding to each of the block frames is the same. For example, the block frame A and the block frame B correspond to different physical channels and/or different transmission slots, but a length of the transmission slot and a transmission bandwidth of the physical channel for block frame A and block frame B are the same. Generally, the numbers of block frames included in all frames and positions of channel resources in all frames are the same. The numbers of block frames in the frame and the number of physical channels corresponding to the block frames in the frame can be dynamically configured according to a physical connection and a transmission requirement between the transmission nodes. That is, a pattern of the frame may be configured dynamically.

In this embodiment, the physical channel may be a transmission channel formed by connecting connection interfaces of the transmission nodes in the FTN network. The transmission channel may include a transmission fiber, a physical link between two transmission nodes, and the like.

In this embodiment, a configuration parameter of the logical channel is determined. The configuration parameter herein may include a type of the logical channel. In other embodiments, the configuration parameter may further include the number of configured logical channels. In this embodiment, at least two or more types of different logical channels can be configured in the FTN. For example, different logical channels have different transmission delays, then effective utilization rates of physical transmission resources corresponding to different logical channels are also different. Generally, the smaller the transmission delay is, the lower the effective utilization rate of the physical transmission resources is. When the transmission delay is larger, the effective utilization rate of the physical transmission resources is higher.

In this embodiment, the transmission channel may include the following three types of logical channels.

The logical channel includes a direct connection channel, a shared channel, and a hybrid channel.

The direct connection channel is a direct transmission channel on which data is forwarded transparently between any two transmission nodes using pre-allocated physical transmission resources.

The shared channel is a statistical multiplexing channel on which data is transported between any two neighbor transmission nodes using dynamically allocated physical transmission resources.

The hybrid channel consists of a direct connection path and a shared path. The direct connection path is a transmission path on which data is forwarded transparently between the transmission nodes using predetermined and pre-allocated physical transmission resources. The shared path is a transmission path on which dynamically allocated physical transmission resources are used for packet forwarding.

For example, in a hybrid channel, direct connection paths are used in some positions and shared paths are used in other positions, thereby implementing the composition of two types of links within one channel.

In the above three types of logical channels, a transmission mode for the direct connection channel is transparent forwarding, and the used physical transmission resources are pre-allocated. After receiving the transmission data carried in a block frame to which the direct connection channel is mapped, the transmission node directly selects the corresponding physical transmission resources for transmission. The transmission node does not perform data parsing and route selecting. Therefore, a data transmission delay of the direct connection channel is minimum. Moreover, since the physical transmission resources are pre-allocated, the transmission delay can also be determined in advance, which is equivalent that the transmission delay is also determined.

A forwarding mode for the shared channel is packet forwarding. For packet forwarding, it is necessary to determine a route for data transmission and/or dynamically allocate a transmission bandwidth according to routing. After the data carried in the block frame reaches a transmission node, the transmission node needs to parse the data and selects a route for the data. For example, a destination address is extracted from a packet header or a frame header of the data, routing and forwarding are performed according to the destination address, and a next hop transmission node is determined. One block frame is selected from the current remaining block frames, and physical transmission resource corresponding to the block frame is selected to transport the data. The physical transmission resources herein include a physical channel and/or a transmission slot. By using this type of logical channel, packet forwarding is adopted, and data parsing and routing are required at each transmission node, apparently, the transmission delay will be increased. At the same time, one or more of the remaining block frames are dynamically selected for forwarding, it is equivalent to dynamically allocating the physical transmission resources. A transmission slot corresponding to the allocated transmission resource may be close to the current time or may be far from the current time, so the transmission delay of the data transmission is uncertain. However, in this type of transmission mode, the physical transmission resources can be utilized to the maximum efficiency. It is avoided that the resources cannot be used for other data transmission because of pre-allocation. It is apparent that the waste of physical transmission resources is reduced, and the effective utilization rate of physical transmission resources is improved.

The hybrid channel is essentially a mixture of the direct connection channel and the shared channel. The hybrid channel includes a direct connection path and a shared path. The direct connection path may correspond to a direct connection channel. A predetermined physical transmission resource is used for transparent forwarding between any two transmission nodes on the direct connection path. Transmission resources for data transmission between any two transmission nodes on the shared channel need to be dynamically allocated. Packet switching is performed on the data using a packet switching mode to perform data parsing and routing.

At block S120, according to types and the number of transmission channels, the logical channels corresponding to the transmission channels are mapped to at least one block frame of the frame. A length of a packet that can be transported in one block frame can be dynamically set. For example, a maximum length of the packet that one block frame can transport can be 64 bits.

In the current frame, it is determined that there are three direct connection channels and two hybrid channels to be mapped. Therefore, at block S120, three direct connection channels can be mapped to a first part of block frames in the frame first, then direct connection paths of two hybrid channels are mapped to a second part of block frames in the frame, and the remaining block frames in the frame can be used as block frames to which the shared channels is to be mapped.

For example, the block S120 may include the following operation(s). When the logical channel is the direct connection channel, the direct connection channel is mapped to at least one block frame of the frame; and/or, when the logical channel is a hybrid channel, the hybrid channel is mapped to at least one block frame of the frame at a transmission node where the direct connection path of the hybrid channel is located. The more block frames remaining in a frame, it shows that the more block frames to which the shared channels can be mapped.

At block S130, when performing data forwarding, the corresponding forwarding mode is selected according to a type of a logical channel mapped to one block frame, and based on the forwarding mode, the data transmission is performed using the physical transmission resource corresponding to the block frame.

For example, when channels mapped to the block frame C and the block frame D are both direct connection channels, then at block S130, transparent forwarding is adopted. The physical channels and transmission slots corresponding to each of the block frame C and the block frame D are used to perform data transparent forwarding between the transmission nodes respectively. On the one hand to ensure a small transmission delay, on the other hand to ensure a stable transmission delay.

In some embodiments, the block S110 may include the following action.

The configuration parameter is determined according to a negotiation between a source node for sending the data to be transported and a sink node for receiving the data to be transported.

The source node here is an originating node for sending the data, and the sink node is a destination node for receiving the data.

The FTN may include an access-type front-haul transport node (FTN-ACC) and an aggregation-type front-haul transport node (FTN-AGG). The FTN-ACC is connected to a radio remote unit (RRU), and the FTN-AGG is mainly connected to a BBU. When the source node is the FTN-ACC, the sink node may be the FTN-AGG; and when the source node is the FTN-AGG, the sink node is the FTN-ACC.

In this embodiment, the source node and the sink node can determine the amount of data currently to be exchanged and a transmission delay required by the data through a negotiation, then can determine a type of the logical channel according to the transmission delay, and can determine the number of required transmission channels according to the amount of data.

Of course, in some embodiments, a control node of a control plane may also determine the configuration parameter by negotiating with the source node. When the configuration parameter is determined, the block S110 may include the following actions. A type of the logical channel is determined according to a transmission delay of the data to be transported. And the number of the logical channels is determined according to the amount of the data to be transported.

In some embodiments, the block S130 may include the following actions.

A forwarding mode is determined according to the type of the logical channel; and data carried in the block frame is transported according to the forwarding mode.

In this embodiment, the forwarding mode is determined according to the type of the logical channel. For example, when the current logical channel is a direct connection channel, the forwarding mode may be transparent forwarding. Then parsing and routing are not performed on the data, and the data is directly transported to a next transmission node according to the physical transmission resource mapped to the direct connection channel. For example, when the forwarding mode is transparent forwarding, the data carried in the block frame is transparently forwarded using the physical transmission resource corresponding to the block frame.

When the current logical channel is a shared channel, the forwarding mode may be packet forwarding. It is required to extract a destination address carried in the data received from the previous transmission node. The destination address here may be a destination internet protocol (IP) address. The data is routed and forwarded according to the IP address. Then a physical channel is determined, an idle block frame on the physical channel is selected, and the data is transported in the idle block frame.

When the current channel is a hybrid channel, each of the transmission nodes on the hybrid channel will know whether the current channel is a direct connection path or a shared path. When the current channel is a shared path, packet forwarding is selected. When the current channel is a direct connection path, transparent forwarding is used. For the forwarding modes of transparent forwarding and packet forwarding, reference is made to the corresponding part mentioned above, which is not described here.

In some embodiments, the forwarding mode further includes packet forwarding. The method further includes the following operations. When the packet forwarding is performed, a block frame in the frame, to which the logical channel has not been mapped, is selected. Routing is performed based on the destination address of the data to be transported, and the data is forwarded to a next hop transmission node.

Since the physical transmission resource is dynamically allocated in the packet forwarding mode, a certain type of data is not mapped to the corresponding block frame in advance. After the data is transported to a transmission node, the transmission node needs to perform routing according to the destination address of the data, to determine physical channel(s) capable of transporting the data. Then a block frame to which the direct connection channel or the hybrid channel has not been mapped is selected from the physical channel that can forward the data to perform mapping for the current forwarding. Dynamic allocation of physical transmission resources is performed, and the data is forwarded to the next transmission node using the selected physical transmission resources. The next transmission node repeats the above operations, performs data parsing and routing repeatedly, until forwarding the data to the destination node.

In some embodiments, the block S120 may include the following action.

The logical channel is mapped to at least one block frame of the frame according to a preset mapping policy.

The preset mapping policy herein may include at least one of a time priority policy, a channel priority policy, or a distributed continuous priority policy for a physical transmission resource.

For example, in some embodiments, the operation of mapping the logical channel to at least one block frame of the frame according to the preset mapping policy includes the following actions.

An idle physical channel corresponding to the logical channel is determined according to a priority of a physical channel number; and an idle time slot of the physical channel corresponding to the logical channel is determined according to a time sequence after the physical channel is determined.

The physical channel number here may be a serial number of the physical channel. A transmission fiber or a transmission interface corresponding to the physical channel number is preferential. The priority of the physical channel number here may be an ascending order of the number or a descending order of the number. The time sequence may be a sequence of the transmission slot.

In this embodiment, according to the priority of the physical channel number, a physical channel that currently has an idle time slot is selected, then idle time slots for data transmission are selected according to the time sequence. For example, both the physical channel A and the physical channel B have idle time slots. When the physical channel number of the physical channel A is less than the physical channel number of the physical channel B, the physical channel A is preferentially selected according to the ascending order of the number. When there are N idle time slots on the physical channel A, it is necessary to select M time slots from the N idle time slots for transmission. When N is greater than M, the M transmission slots with earlier transmission slots may be preferentially selected according to the time sequence. After the physical channel and the transmission slot are determined, the block frame corresponding to the logical channel is determined according to preset correspondences between the block frames and the physical transmission resources.

In other embodiments, the operation of mapping the logical channel to at least one block frame of the frame according to the preset mapping policy includes the following actions.

An idle time slot corresponding to the logical channel is determined according to a time sequence; and a physical channel in which the idle time slot is located is determined according to the priority of the physical channel number.

This embodiment is different from the foregoing implementation in that, in this embodiment, the idle time slot is selected firstly according to the time sequence, after selecting the idle time slot, then the corresponding physical channel is selected according to physical channel number. In this case, when current idle physical channel includes the physical channel A and the physical channel B, a physical channel number of the physical channel A is less than a physical channel number of the physical channel B while an idle time slot of the physical channel A is later than an idle time slot of the physical channel B, the physical channel B with an earlier idle time slot may be selected. The physical channel A is preferentially selected according to the physical channel number only if the current idle time slot of the physical channel B is insufficient to satisfy the corresponding logical channel.

In other embodiments, the operation of mapping the logical channel to at least one block frame of the frame according to the preset mapping policy includes the following action.

When the number of the block frames corresponding to one logical channel is greater than two, the logical channel is mapped to block frames that are continuously distributed in a time dimension and/or a channel dimension.

The block frames continuously distributed in the time dimension include multiple block frames continuously distributed in time domain when being selected. The block frames continuously distributed in the channel dimension include block frames of the same channel or multiple adjacent channels in the frame.

Figure 2:
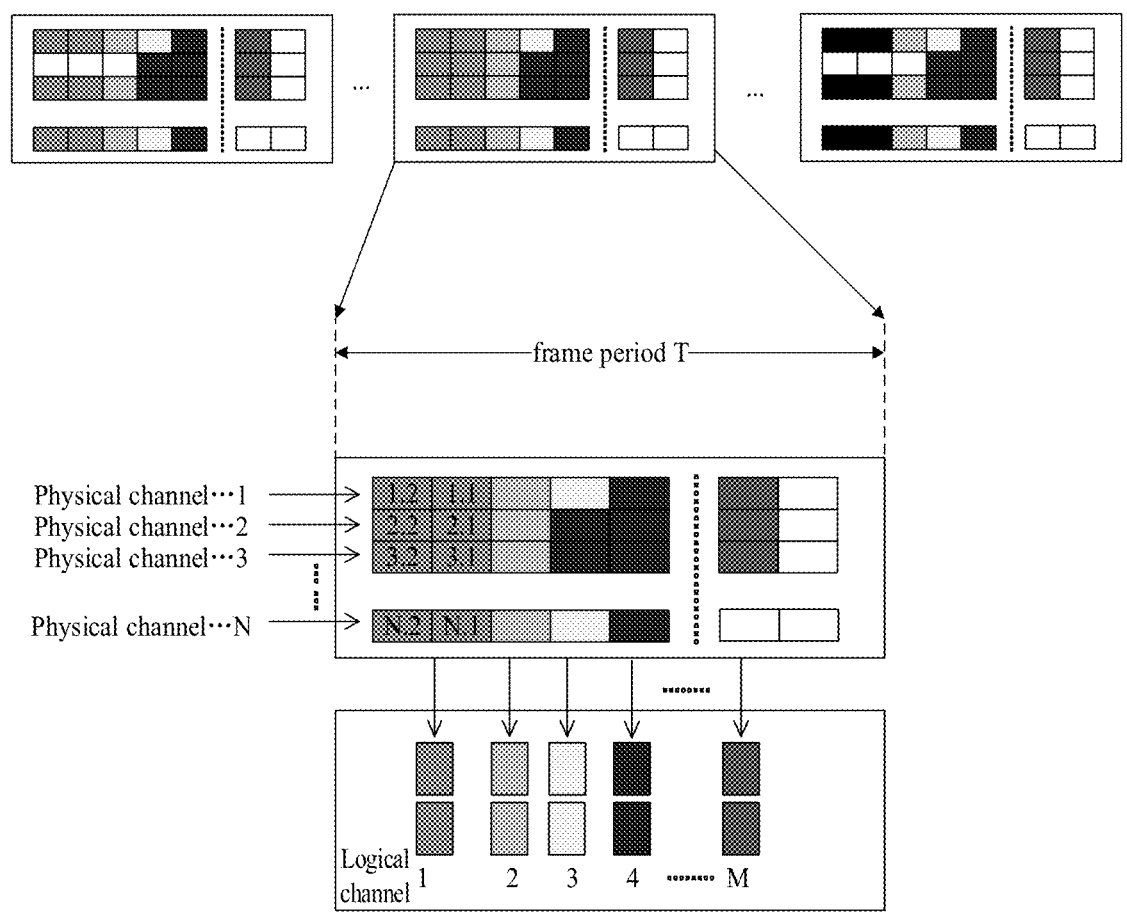
FIG. 2 is a schematic structural diagram of a frame according to an embodiment of the present disclosure.

FIG. 2 illustrates correspondences between a physical channel, a logical channel and a frame. In FIG. 2, a horizontal axis is a time axis and a vertical axis is a channel axis. It is apparent from FIG. 2 that the physical channels are distributed at different positions on the vertical axis. A position of the block frame depends on its coordinates on the horizontal and vertical axes. When a time slot and a physical channel corresponding to a block frame are determined, a position of the block frame in the frame is also determined.

In the foregoing embodiment, multiple block frames corresponding to one logical channel are continuously distributed, as illustrated in FIG. 2. The logical channel 1 is mapped to all block frames corresponding to the physical channels 1 to N in a first time slot and a second time slot. The logical channel 2 is mapped to all block frames corresponding to the physical channels 1 to N in a third time slot. Also FIG. 2 illustrates the logical channels 3, the logical channel 4 to the logical channel M. FIG. 2 also illustrates an idle block frame. The idle block frame here is the block frame to which the direct connection channel or the hybrid channel has not been mapped, which can be regarded as a block frame to which a shared channel is to be mapped, or a block frame used for subsequent dynamically allocating physical channel resources for packet forwarding.

Figure 3:
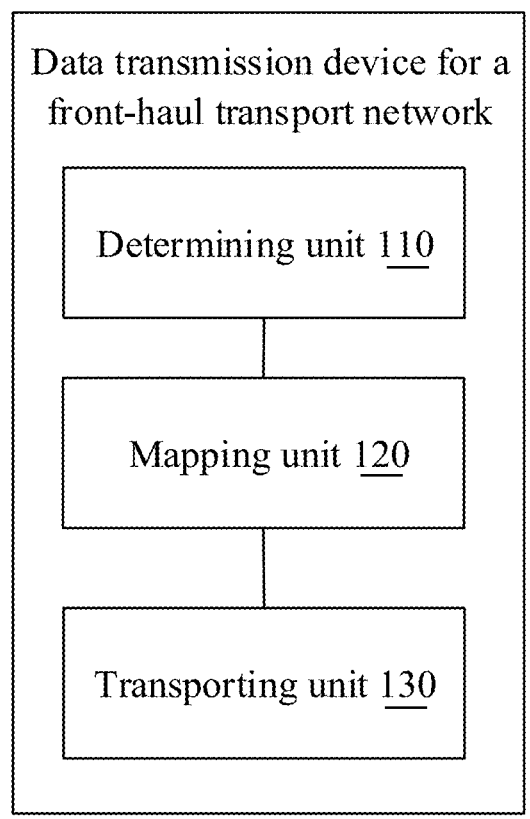
FIG. 3 is a schematic structural diagram of a data transmission device for an FTN according to an embodiment of the present disclosure.

As illustrated in FIG. 3, this embodiment provides a data transmission device for an FTN, which includes a determining unit 110, a mapping unit 120 and a transporting unit 130.

The determining unit 110 is configured to determine a configuration parameter of a logical channel for data transmission, where the configuration parameter includes a type of the logical channel. Different transmission channels have different transmission delays and/or utilization rates of physical transmission resources.

The mapping unit 120 is configured to map the logical channel to at least one block frame of a frame based on the configuration parameter, where each block frame has a preset correspondence with the physical transmission resource.

The transporting unit 130 is configured to transport data carried in the block frame according to the type of the logical channel mapped to the block frame.

The device for data transmission in this embodiment may be applicable to each transmission node in the FTN.

The determining unit 110 and the mapping unit 120 may correspond to a processor or a processing circuit in the transmission node. The processor may include a central processing unit, a microprocessor, a digital signal processor, an application processor or a programmable array, and the like. The processing circuit can include an application specific integrated circuit. The processor or processing circuit can determine the configuration parameter by execution of a predetermined code or program, and map the logical channel to the block frame according to the configuration parameter, thereby mapping the logical channel to the physical channel of the physical transmission resource and the transmission slot.

The transporting unit 130 may correspond to a transmission interface in the transmission node, and can be used to transport data using a corresponding transmission resource.

In this embodiment, there are more than one type of transmission channel, and different transmission channels have different transmission delays and/or utilization rates of physical transmission resources. In this case, it is equivalent to configuring at least two types of logical channels in the frame, so that the transmission requirements of different data can be satisfied. On the one hand, a transmission delay requirement of the data can be satisfied as much as possible, on the other hand, the effective utilization rates of the physical transmission resources can be improved as much as possible.

In some embodiments, the determining unit 110 is configured to determine the configuration parameter according to a negotiation between a source node for sending the data to be transported and a sink node for receiving the data to be transported.

The source node and the sink node are both transmission nodes in the FTN. Before the data communication is performed, the source node and the sink node may negotiate the data transmission and determine the configuration parameter according to a result of the negotiation. The content of the negotiation here includes the amount of data transported this time, a transmission delay requirement, and the like. After the source node and the sink node negotiate, the result of the negotiation may be broadcast to other transmission nodes. Of course, the source node and the sink node can directly negotiate a transmission path, and can notify a transmission node to be passed on the transmission path of the negotiation result. Of course, the negotiation between the source node and the sink node may further include a negotiation of a service type of the data. The transmission node may further determine a type of a logical channel in the configuration parameter according to correspondences between the service types and the transmission delays.

For example, the determining unit 110 is configured to determine a type of the logical channel according to a transmission delay of data to be transported; and/or the determining unit 110 is further configured to determine the number of logical channels according to the amount of the data to be transported.

In this embodiment, it is specifically defined that the type of the logical channel corresponding to the block frame in the current frame is determined according to the transmission delay, and that the number of corresponding logical channels is determined according to the amount of data to be transported. Therefore, the determining unit 110 determines at least the type and number of logical channels corresponding to the current frame.

In some embodiments, the transporting unit 130 is configured to determine a forwarding mode according to a type of the logical channel, and transport data carried in the block frame according to the forwarding mode.

Different logical channels correspond to different forwarding modes. For example, some logical channels correspond to transparent forwarding, and other logical channels correspond to packet forwarding. The data carried in the block frame to which the logical channel has been mapped is transported in the forwarding mode corresponding to the type of the logical channel, thereby controlling the scheduling of the physical transmission resources and forwarding mode for the data. Accordingly, data can be transported according to different data transmission requirements, on the one hand to ensure the delay of data transmission, on the other hand to improve the effective utilization rate of the physical transmission resources of the data as much as possible.

In some embodiments, the transporting unit 130 is configured to transparently forward the data carried in the block frame using a physical transmission resource corresponding to the block frame when the forwarding mode is transparent forwarding.

For example, the $n^{th}$ transmission node receives data from the $n-1^{th}$ transmission node, and determines that the data is transported using a pre-configured block frame A (i.e., a pre-allocated physical transmission resource). The data is directly transported to the $n+1^{th}$ transmission node using the pre-configured block frame B without parsing. Here, n is an integer not less than 1, and is not greater than a total number of transmission nodes in the transmission link. In this case, the $n^{th}$ transmission node does not know a specific content of current data. That is, a transparent forwarding can be implemented.

In some implementations, the forwarding mode further includes packet forwarding.

The transporting unit 130 is further configured to: when performing the packet forwarding, select a block frame to which the logical channel has not been mapped in the frame, perform routing based on a destination address of the data to be transported, and forward the data to be transported to a next hop transmission node.

In this embodiment, routing is performed based to the destination address. In this embodiment, the transporting unit 130 is further configured to determine a next transmission node after performing routing, then a physical channel connected to the next transmission node is selected for data transmission, and an idle transmission slot of the physical channel that has not been allocated is selected for data transmission. Apparently, packet forwarding includes the following operations. Routing is performed based on the destination address, and physical transmission resources are dynamically allocated based on a routing result, that is, a block frame is selected for data transmission, and the data is transported in the selected block frame.

In some embodiments, the logical channel includes two or three of a direct connection channel, a shared channel and a hybrid channel. The direct connection channel is a direct transmission channel on which transparent forwarding of data is performed between any two transmission nodes using a pre-allocated physical transmission resource. The shared channel is a statistical multiplexing channel on which data transmission is performed between any two neighbor transmission nodes using dynamically allocated physical transmission resources. The hybrid channel includes a direct connection path and a shared path. The direct connection path is a transmission path on which transparent forwarding is performed between the transmission nodes using a predetermined and pre-allocated physical transmission resource. The shared path is a transmission path on which packet forwarding is performed between the transmission nodes using a dynamically allocated physical transmission resource.

Further detailed descriptions of several logical channels herein can be referred to the foregoing embodiments and will not be described here.

In some embodiments, the mapping unit 120 is configured to map the direct connection channel to at least one block frame of the frame when the logical channel is the direct connection channel; and/or, when the logical channel is a hybrid channel, map the hybrid channel to at least one block frame of the frame at a transmission node where the direct connection path is located in the hybrid channel.

The mapping unit 120 herein preferentially maps a direct connection channel and a direct connection path portion of the hybrid channel to the block frames of the frame according to the configuration parameter of the logical channel. When the direct connection channel and the direction connection path portion of the hybrid channel are mapped and there are remaining block frames in a frame, the remaining block frames can be regarded as block frames for dynamic allocation, or block frames to which shared channels can be mapped. When the $n^{th}$ transmission node receives data from the $n-1^{th}$ transmission node and the data is transported through the shared channel, the $n^{th}$ transmission node also selects a block frame that has not yet mapped to the direct connection channel or the hybrid channel from the frame configured by itself to perform data transmission, thereby realizing data packet forwarding through the shared channel, and improving the effective utilization rate of the transmission resource as much as possible.

In some embodiments, the mapping unit 120 is configured to map the logical channel to at least one block frame of the frame according to a preset mapping policy.

The preset mapping strategy here may be transported by a control node on a control plane of an FTN, or may be determined based on a negotiation between a source node and a sink node.

In some embodiments, the mapping unit 120 is configured to determine a physical channel corresponding to the logical channel according to a priority of a the physical channel number; and after determining the physical channel, determine an idle time slot of the physical channel corresponding to the logical channel according to a time sequence.

Therefore, in this embodiment, mapping is first performed based on the physical channel number of the physical channel, then mapping is performed based on the time sequence.

In other embodiments, the mapping unit 120 is configured to determine an idle time slot corresponding to the logical channel according to a time sequence; and after determining the idle time slot, determine a physical channel where the idle time slot is located according to a priority of the physical channel number.

In this embodiment, the mapping is performed based on the time sequence preferentially and then based on the physical channel.

Which preset mapping mode is adopted may also be determined according to a transmission delay requirement of data. For example, data with very high transmission delay requirement may be transported preferentially based on the time sequence and then based on the priority of the physical channel number to minimize the transmission delay.

In some embodiments, the mapping unit 120 is configured to map the logical channel to block frames continuously distributed in a time dimension and/or a channel dimension when the number of block frames corresponding to the one logical channel is greater than two.

One logical channel is mapped to continuously distributed block frames so that the data transported by one logical channel is concentrated as much as possible on the sink node, thereby facilitating data integration of the sink node.

Several specific examples are provided below in conjunction with any of the above embodiments.

FIRST EXAMPLE

Figure 4:
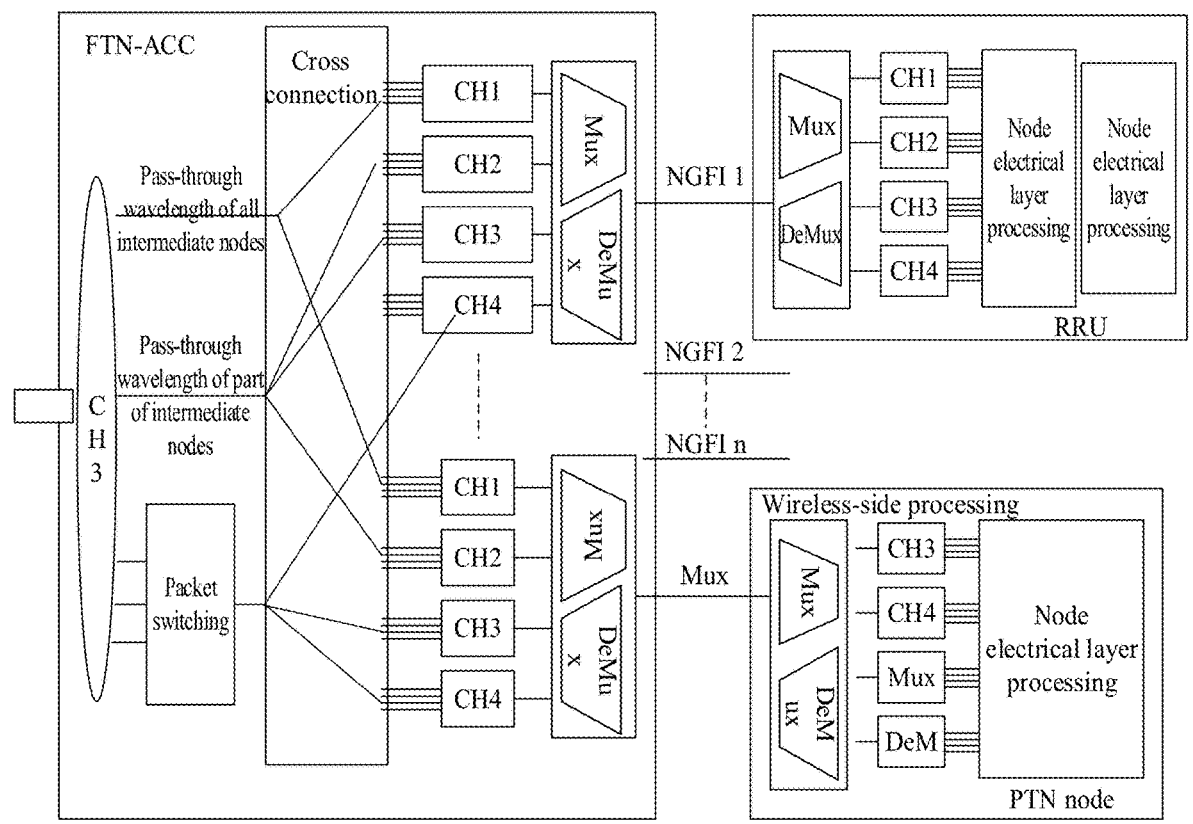
FIG. 4 is a schematic diagram of a network architecture of an FTN according to an embodiment of the present disclosure.

As illustrated in FIG. 4, a network architecture of an FTN is provided. The FTN includes a controller and a next generation front-haul interface (NGFI) connected to the RRU. There are n NGFIs illustrated in FIG. 4, numbered from NGFI 1, NGFI 2 . . . NGFI n respectively. The NGFI may be used to perceive load condition information, determine a configuration parameter of the logical channel according to the perceived load condition information, and implement the transmission docking using the logical channel as an object. Both the RRU and the BBUs can be regarded as a wireless side of a wireless network. The NGFI is an interface connected to the RRU or BBUs. In this embodiment, the NGFI interface can detect the load condition information. For example, the load condition information of the current FTN can be comprehensively determined according to the number of antennas, a modulation mode of the RRU, and the like. The load condition information herein may be information capable of reflecting a transmission load or a transmission load rate of the FTN.

Also a multiplexer Mux and a demultiplexer DeMux are illustrated in FIG. 4. In FIG. 4, there are three types of channels, which are a wavelength channel corresponding to the direct connection channel and capable of allowing each intermediate node to perform direct forwarding, a wavelength channel corresponding to the hybrid channel and capable of allowing part of intermediate nodes to perform direct forwarding, and packet switching channel corresponding to the shared channel. The FTN-ACC performs mapping separately according to different selected channels. For the channel indicated by CH in FIG. 4, the numbers of CH, for example, 1, 2, 3, and 4, indicate the number of the channel in the corresponding node. Generally, the FTN is a fiber-optic network. After receiving an electromagnetic signal sent by the terminal, the RRU may need to perform node electrical layer processing and convert the electromagnetic signal into an optical signal for transmission.

The controller or the transmission node itself is configured to dynamically determine parameters such as a type and the number of logical channels according to the load condition information.

For example, traffic that requires an extremely short delay may be transported on specific logical channels. In the process of mapping to physical transmission resources of the physical layer, these logical channels are directly mapped to physical channels that can be used for transparent forwarding, thereby ensuring to send the traffic with a very low delay. For data transported using other types of logical channels, the transmission node needs to parse the received data and perform routing and dynamic allocation of transmission resources before sending the data to a next transmission node. The data parsing here includes at least extracting a destination IP address of the data, selecting a physical channel based on the destination IP address, and selecting an idle time slot of the physical channel for transmission, thereby performing the above-mentioned routing and dynamic allocation of the physical transmission resources hop by hop until reaching a destination transmission node.

SECOND EXAMPLE

FIG. 2 illustrates a mapping relationship between a frame and a physical channel, a logical channel, and a time slot resource, which is equivalent to that FIG. 2 illustrates a pattern of a frame.

A duration corresponding to each frame is a period T. That is, a time interval between two adjacent frames is also T. For example, when one block frame of the frame corresponds to one time slot t, the number of block frames included in the one Tis T/t.

In FIG. 2, the number of physical channels corresponding to one frame is N, which is from physical channel 1, physical channel 2, physical channel 3, to physical channel N, respectively. The frame illustrated in FIG. 2 corresponds to M logical channels, which are logical channel 1, logical channel 2 to logical channel M. Both the N and the M are positive integers not less than 1. In FIG. 2, a serial number of the block frame may consist of a serial number of the physical channel where the block frame is located and a number of a time slot in which the block frame is located. For example, when a physical channel corresponding to the block frame A is numbered n and the time slot in which the block frame is located is numbered m, a serial number of the block frame A may be n.m. In a specific implementation, the serial number of the block frame A may also be m.n. In the serial number of the block frame illustrated in FIG. 2, a serial number of the physical channel is first and the time slot number is after.

In a specific implementation, the frame corresponding to each period T includes the same number of block frames and corresponding physical channels.

The period of the pattern of the frame and the number and position of the logical channels therein may be adjusted as needed.

The number of physical channels in the pattern of the frame is not limited to N in a specific implementation, and can be increased or decreased as needed.

The number of logical channels M in the pattern of the frame can be adjusted and configured as needed.

A position of the block frame corresponding to the logical channel in the pattern of the frame can be arbitrarily selected. Preferably, the block frames corresponding to the same logical channel can be placed in close positions as much as possible. For example, the block frame corresponding to the same logical channel is continuously distributed in the pattern of the frame.

The pattern of the frame can be coordinated and configured by a control plane or a management plane of a network, or may be communicated through a control word or a protocol of the data plane.

A size, a format, a transmission rate, and the like of the block frame are not limited. For example, the block frame may be a block frame in a format of an optical channel data unit (ODUk), or may be a block frame in an encoding format of 8B/10B or 64B/66B.

There are two following manners for ranking the block frames corresponding to the same logical channel.

In a first manner, the block frames are ranked according to an ascending order of arrival time on a physical channel-by-physical channel basis. Taking logical channel 1 as an example, the numbers of the block frames corresponding to logical channel 1 are: 1.1-1.2-2.1-2.2-3.1-3.2-....-N. 1-N.2.

In a second manner, the block frames are ranked according to an ascending order of series numbers of logical channels on a time slot-by-time slot basis. Taking logical channel 1 as an example, the numbers of the selected block frames are: 1.1-2.1-3.1-....-N.1-1.2-2.2-3.2-....-N.2.

THIRD EXAMPLE

Figure 5:
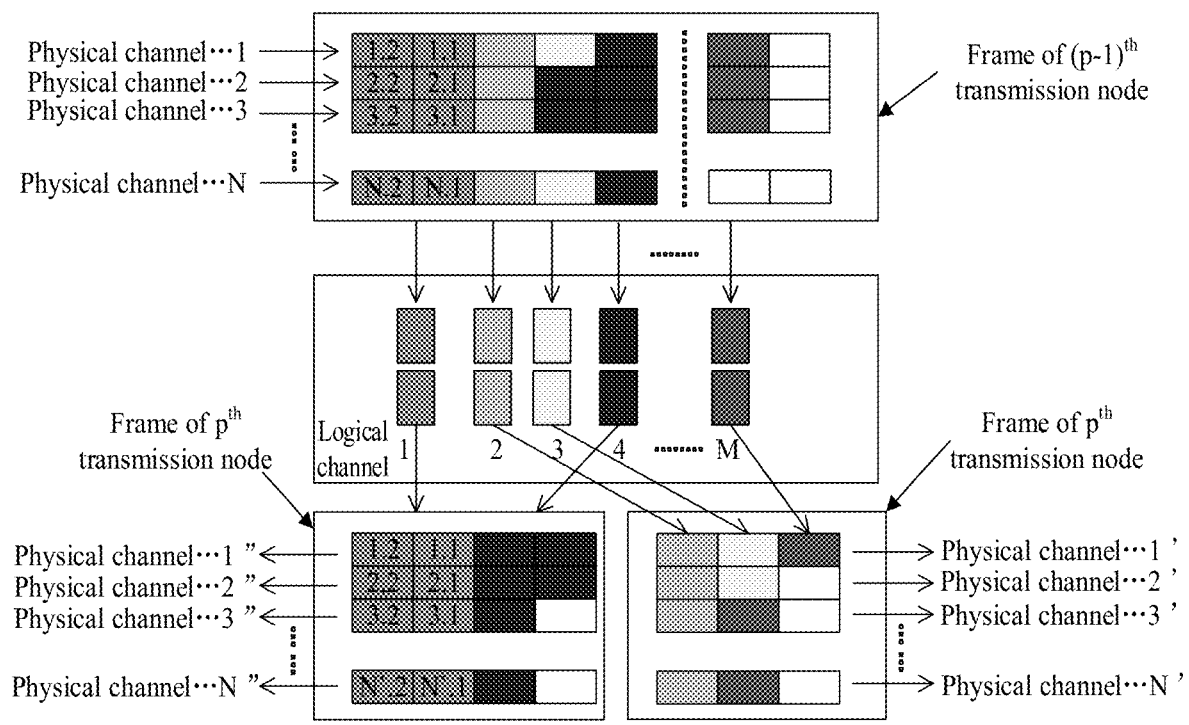
FIG. 5 is a schematic diagram of transparent forwarding through a direct connection channel according to an embodiment of the present disclosure.

FIG. 5 illustrates logical channel 1 to logical channel M. All the logical channels are direct connection channels, and transparent forwarding is adopted for transmission between transmission nodes.

The $(p-1)^{th}$ transmission node in FIG. 5 corresponds to physical channel 1 to physical channel N. A frame of the $p^{th}$ transmission node is different from a frame of the $(p-1)^{th}$ transmission node. There are two types of frames at the $p^{th}$ transmission node. A first type of frame corresponds to physical channel 1' to the physical channel N'. A second frame corresponds to physical channel 1" to physical channel N". Apparently, after data is transported from the $(p-1)^{th}$ transmission node to the $p^{th}$ transmission node, the $p^{th}$ transmission node can select a pre-configured block frame for data transmission according to a block frame adopted by a previous transmission node. The $p^{th}$ transmission node does not parse and route the data, and directly forwards transparently the data in a pre-configured block frame.

Figure 6:
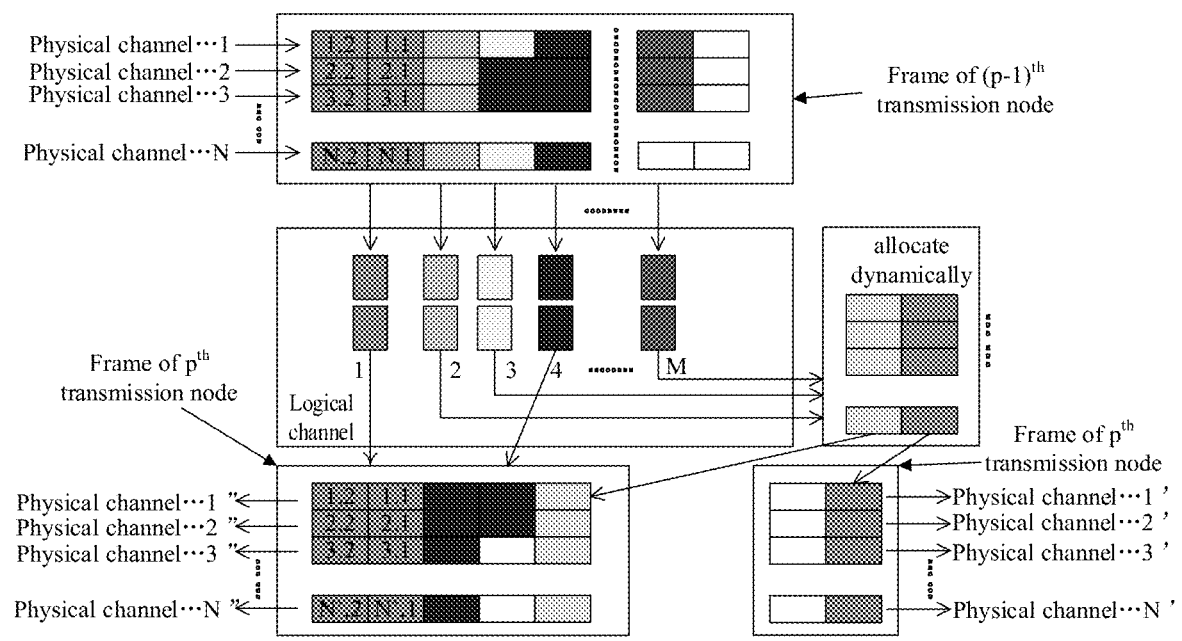
FIG. 6 is a schematic diagram of packet forwarding through a hybrid channel according to an embodiment of the present disclosure.

FIG. 6 illustrates logical channel 1 to logical channel M, and all the logical channel 1 and logical channel 4 are direct connection channels, and the remaining logical channels are hybrid channels. In FIG. 5 and FIG. 6, physical channels corresponding to the frames of the two transmission nodes are identical.

Apparently, it can be seen from FIG. 6, the logical channel 1 and the logical channel 4 have corresponding mapped block frames in frames of the $(p-1)^{th}$ transmission node and the $p^{th}$ transmission node, and other logical channels have only block frames in the $p^{th}$ transmission node to be dynamically allocated. The dynamic allocation may include parsing data transported through the logical channel, performing routing and dynamical scheduling of the block frame according to the parsing result, and then performing transmission. It is apparent that in FIG. 6, transparent forwarding is adopted for some logical channels, and packet forwarding is adopted for other logical channels.

FOURTH EXAMPLE

Figure 7:
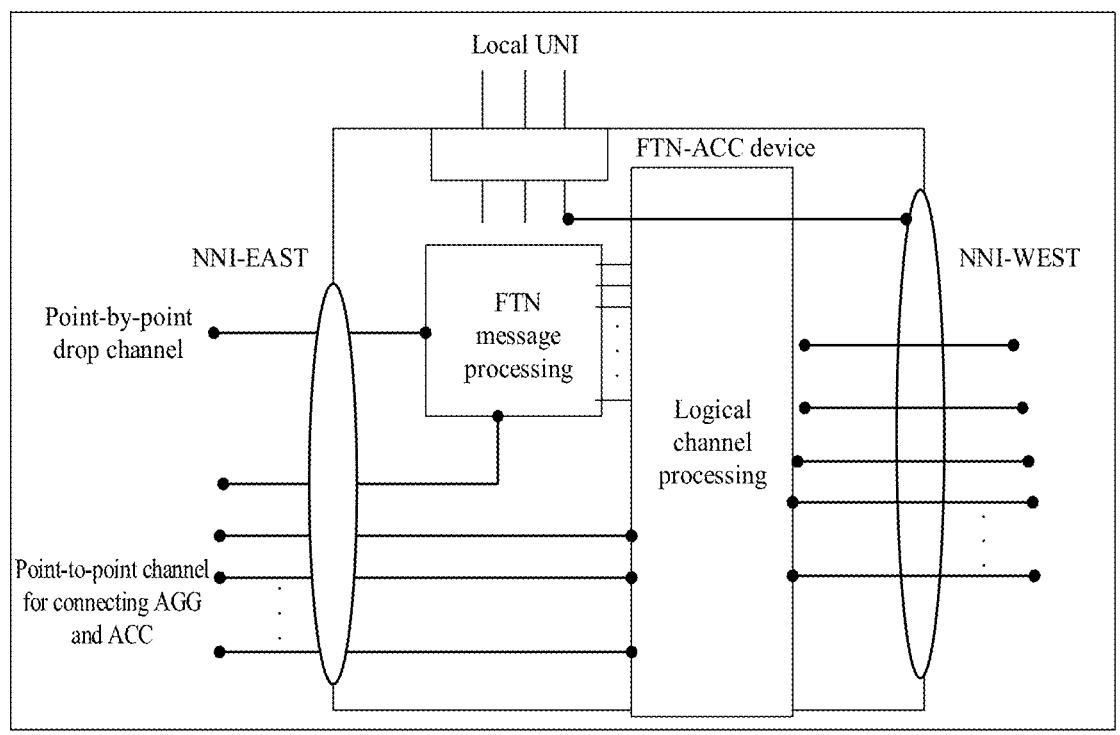
FIG. 7 is a schematic structural diagram of a transmission node according to an embodiment of the present disclosure.

FIG. 7 is a schematic diagram of a transmission node. The transmission node illustrated in FIG. 7 may be an FTN-ACC in the FTN. As illustrated in FIG. 7, a local UNI illustrated in FIG. 7 may be identification information of the current transmission node. NNI-EAST may be a connection interface with an east side transmission node. NNI-WEST may be a connection interface with a west side transmission node. The east and west sides here are the opposite sides of the transmission node. When the east side transmission node is an upstream transmission node of this transmission node, the west side transmission node is a downstream transmission node of this transmission node. When the west side transmission node is an upstream transmission node of this transmission node, the east side transmission node is a downstream transmission node of this transmission node.

After a message enters this transmission node from the downstream transmission node, when the point-to-point channel is used to connect the AGG and the ACC, logical channel processing is directly performed, and this transmission node selects the physical transmission resource corresponding to the point-to-point channel for message transmission. When the data currently received by this transmission node is from a point-by-point drop channel, it is required to perform the FTN message processing. The FTN message processing here includes data parsing, extracting a destination IP address, selecting the corresponding physical channel and transmission slot according to the destination IP address, and transporting the FTN message to a next hop transmission node using the selected physical channel and transmission slot.

The point-to-point channel is one type of the foregoing direct connection channels, and the point-by-point drop channel is one type of the shared channels.

In the several embodiments according to the present disclosure, it should be understood that the disclosed devices and methods may be implemented in other ways. The device embodiments described above are merely illustrative. For example, the division of the units is only a division of logical functions, and there may be another division manner in actual implementation. For example, multiple units or components may be combined or may be integrated into another system, or some features can be ignored or not executed. In addition, the coupling, direct coupling or communication connection of the shown or discussed components may be indirect coupling or communication connection via some interfaces, devices or units, and may be in an electrical, mechanical or other form.

The embodiments of the disclosure further provide a computer storage medium, where the computer storage medium stores computer executable instructions. After the computer executable instructions are executed, the foregoing method for data transmission in the FTN according to one or more foregoing technical solutions can be implemented, such as the method as illustrated in FIG. 1.

The storage medium may be various media that may store program code, such as a mobile storage device, a read-only memory (ROM), a random access memory (RAM), a magnetic disk, or an optical disk. The storage medium may be a non-transitory storage medium.

The above units described as separate components may or may not be physically separated. The components displayed as units may or may not be physical units. That is, they may be arranged in one place, or may be distributed to multiple network units. Some or all of the units may be selected according to actual needs to achieve the purpose of the solution of the embodiment.

In addition, functional units in embodiments of the present disclosure may be integrated into one processing module, or each unit may exist physically separately, or two or more units may be integrated into one unit. The above integrated unit may be implemented in the form of hardware or in the form of hardware and software functional units.

Those skilled in the art will appreciate that all or a portion of actions in the above-described method embodiments may be performed by a program to instruct related hardware, the foregoing program may be stored in a computer-readable storage medium. The program, when executed, performs the operations including the above method embodiments.

The foregoing is only a specific embodiment of the present disclosure, but the scope of protection of the present disclosure is not limited thereto. All the variations or alternatives that readily occur to any of those skilled in the art within the technical scope disclosed in the present disclosure should be covered by the scope of protection of the present disclosure. Therefore, the scope of protection of the present disclosure is subject to the scope of protection of the claims.

INDUS TRAIL APPLICABILITY

In the technical solution in the embodiment of the present disclosure, before performing data transmission, a logical channel for data transmission is determined, and the logical channel is mapped to a block frame of a frame corresponding to the physical transmission resources in advance. Therefore, mapping between the logical channel and the physical transmission resources is realized. And then according to the type of the logical channel, data transmission is performed using the physical transmission resource corresponding to the block frame. Therefore, data transmission of different transmission requirements can be satisfied, thereby having positive technical effects and the characteristics of simple implementation, and the technical solution can be widely used in industry.

The invention claimed is:

1. A data transmission method for a front-haul transport network (FTN), comprising:
   determining a configuration parameter of a logical channel for data transmission, wherein the configuration parameter comprises a type of the logical channel, and different logical channels have at least one of different transmission delays or different utilization rates of physical transmission resources;
   mapping the logical channel to at least one block frame of a frame based on the configuration parameter, wherein each block frame has a preset correspondence with a physical transmission resource; and
   transporting data carried in the at least one block frame according to the type of the logical channel mapped to the at least one block frame,
   wherein a format of the block frame is an encoding format of 64B/66B.

2. The method of claim 1, wherein determining the configuration parameter of the logical channel for data transmission comprises:
   determining the configuration parameter according to a negotiation between a source node for sending data to be transported and a sink node for receiving the data to be transported.

3. The method of claim 1, wherein determining the configuration parameter of the logical channel for data transmission comprises at least one of the following:
   determining the type of the logical channel according to a transmission delay of data to be transported; or
   determining a number of logical channels according to an amount of the data to be transported.

4. The method of claim 1, wherein transporting the data carried in the at least one block frame according to the type of the logical channel mapped to the at least one block frame comprises:
   determining a forwarding mode according to the type of the logical channel; and
   transporting data carried in the at least one block frame according to the forwarding mode.

5. The method of claim 4, wherein transporting the data carried in the at least one block frame according to the forwarding mode comprises:

directly forwarding the data carried in the at least one block frame using a physical transmission resource corresponding to the at least one block frame when the forwarding mode is direct forwarding.

6. The method of claim 5, wherein the forwarding mode further comprises packet forwarding, and the method further comprises:

when performing the packet forwarding, determining a block frame to which the logical channel has not been mapped in the frame, performing routing based on a destination address of the data to be transported, and forwarding the data to be transported to a next hop transmission node.

7. The method of claim 1, wherein the logical channel comprises two or three of a direct connection channel, a shared channel and a hybrid channel;

the direct connection channel is a direct transmission channel on which data is forwarded directly between any two transmission nodes using pre-allocated physical transmission resources;

the shared channel is a statistical multiplexing channel on which dynamically allocated physical transmission resources are used for transmission between any two neighbor transport nodes; and the hybrid channel comprises a direct connection path and a shared path, wherein the direct connection path is a transmission path on which predetermined and pre-allocated physical transmission resources are used for direct forwarding between the transmission nodes, and the shared path is a transmission path on which dynamically allocated physical transmission resources are used for packet forwarding.

8. The method of claim 7, wherein mapping the logical channel to the at least one block frame of the frame according to the configuration parameter comprises at least one of:

mapping the direct connection channel to the at least one block frame of the frame when the logical channel is the direct connection channel; or mapping the hybrid channel to the at least one block frame of the frame at a transmission node where the direct connection path of the hybrid channel is located when the logical channel is the hybrid channel.

9. The method of claim 1, wherein mapping the logical channel to the at least one block frame of the frame according to the configuration parameter comprises:

mapping the logical channel to the at least one block frame of the frame according to a preset mapping policy.

10. The method of claim 9, wherein mapping the logical channel to the at least one block frame of the frame according to the preset mapping policy comprises:

determining an idle physical channel corresponding to the logical channel according to a priority of a physical channel number; and determining an idle time slot of the physical channel corresponding to the logical channel according to a time sequence after determining the idle physical channel.

11. The method of claim 9, wherein mapping the logical channel to the at least one block frame of the frame according to the preset mapping policy comprises:

determining an idle time slot corresponding to the logical channel according to a time sequence; and determining a physical channel where the idle time slot is located according to a priority of the physical channel number after determining the idle time slot.

12. The method of claim 9, wherein mapping the logical channel to the at least one block frame of the frame according to the preset mapping policy comprises:

mapping the logical channel to block frames that are continuously distributed in at least one of a time dimension or a channel dimension when a number of the block frames corresponding to the logical channel is greater than two.

13. A data transmission device for a front-haul transport network (FTN), comprising:

a processor, and a transmission interface, wherein the processor is configured to:

determine a configuration parameter of a logical channel for data transmission, wherein the configuration parameter comprises a type of the logical channel, and different logical channels have at least one of different transmission delays or different utilization rates of physical transmission resources; and map the logical channel to at least one block frame of a frame according to the configuration parameter, wherein each block frame has a preset correspondence with a physical transmission resource; and wherein the transmission interface is configured to transport data carried in the at least one block frame according to the type of the logical channel mapped to the at least one block frame; and wherein a format of the block frame is an encoding format of 64B/66B.

14. The device of claim 13, wherein the processor is configured to:

determine the configuration parameter according to a negotiation between a source node for sending data to be transported and a sink node for receiving the data to be transported; or perform at least one of the following:

determining the type of the logical channel according to a transmission delay of data to be transported; or determining a number of logical channels according to an amount of the data to be transported.

15. The device of claim 13, wherein the transmission interface is configured to:

determine a forwarding mode according to a type of the logical channel, and transport data carried in the at least one block frame according to the forwarding mode, wherein the transmission interface is specifically configured to:

directly forward the data carried in the at least one block frame using a physical transmission resource corresponding to the at least one block frame when the forwarding mode is direct forwarding; or when performing packet forwarding, determine a block frame to which the logical channel has not been mapped in the frame, perform routing based on a destination address of the data to be transported, and forward the data to be transported to a next hop transmission node.

16. The device of claim 13, wherein the logical channel comprises two or three of a direct connection channel, a shared channel and a hybrid channel;

the direct connection channel is a direct transmission channel on which data is forwarded directly between any two transmission nodes using pre-allocated physical transmission resources;

the shared channel is a statistical multiplexing channel on which dynamically allocated physical transmission resources are used for transmission between any two neighbor transmission nodes; and the hybrid channel comprises a direct connection path and a shared path, wherein the direct connection path is a transmission path on which predetermined and pre-allocated physical transmission resources are used for direct forwarding between the transmission nodes, and the shared path is a transmission path on which dynamically allocated physical transmission resources are used for packet forwarding.

17. The device of claim 16, wherein the processor is further configured to perform at least one of the following:

mapping the direct connection channel to the at least one block frame of the frame when the logical channel is the direct connection channel; or mapping the hybrid channel to the at least one block frame of the frame at a transmission node where the direct connection path of the hybrid channel is located, when the logical channel is the hybrid channel.

18. The device of claim 13, wherein the processor is configured to map the logical channel to at least one block frame of the frame according to a preset mapping policy, wherein the processor is specifically configured to:

determine an idle physical channel corresponding to the logical channel according to a priority of a physical channel number; and determine an idle time slot of the physical channel corresponding to the logical channel according to a time sequence after determining the idle physical channel;

or, determine an idle time slot corresponding to the logical channel according to a time sequence; and determine a physical channel where the idle time slot is located according to a priority of the physical channel number after determining the idle time slot;

or, map the logical channel to block frames that are continuously distributed in at least one of a time dimension or a channel dimension, when a number of the block frames corresponding to the logical channel is greater than two.

19. A non-transitory computer storage medium, wherein the non-transitory computer storage medium stores computer executable instructions; when the computer executable instructions are executed, a method for data transmission in an FTN is implemented, wherein the method comprises:

determining a configuration parameter of a logical channel for data transmission, wherein the configuration parameter comprises a type of the logical channel, and different logical channels have at least one of different transmission delays or different utilization rates of physical transmission resources;

mapping the logical channel to at least one block frame of a frame based on the configuration parameter, wherein each block frame has a preset correspondence with a physical transmission resource; and transporting data carried in the at least one block frame according to the type of the logical channel mapped to the at least one block frame, wherein a format of the block frame is an encoding format of 64B/66B.

* * * * *